United States Patent [19]

Rupp

[11] Patent Number: 4,993,346

[45] Date of Patent: Feb. 19, 1991

[54] OUTRIGGER SYSTEMS FOR MOTORBOATS

[76] Inventor: Herbert E. Rupp, 4761 Anchor Ave., Pt. Salerno, Fla. 33492

[21] Appl. No.: 498,552

[22] Filed: Mar. 26, 1990

Related U.S. Application Data

[63] Continuation-in-part of Ser. No. 395,817, Aug. 18, 1989, abandoned.

[51] Int. Cl.⁵ ............................................. B63B 35/14
[52] U.S. Cl. .................................... 114/255; 114/361; 43/21.2
[58] Field of Search ................. 114/255, 361; 43/21.2, 43/43.12; 248/512, 513, 538, 539, 540, 541; 212/229

[56] References Cited

U.S. PATENT DOCUMENTS

| | | | |
|---|---|---|---|
| 1,517,562 | 12/1924 | Ljungman et al. | 212/229 |
| 3,008,259 | 11/1961 | Zornes | 43/43.12 |
| 3,161,390 | 12/1964 | Larson | 43/21.2 |
| 3,190,594 | 6/1965 | Chiou | 43/21.2 |
| 3,648,956 | 3/1972 | Paulson et al. | 212/229 |
| 3,802,112 | 4/1974 | Banner | 43/21.2 |
| 4,687,168 | 8/1987 | Rupp | 248/539 |

Primary Examiner—Sherman D. Basinger
Assistant Examiner—Thomas J. Brahan
Attorney, Agent, or Firm—Carroll F. Palmer

[57] ABSTRACT

An improved outrigger device for a T-Top equipped motorboat that permits the outrigger thereof located above the T-Top to be moved from a stowage position to a trolling position and vis versa by an occupant of the boat standing in the shelter of such T-Top includes a tubular member having an upper end portion and a lower end portion joined integrally to a central portion that extends through such T-Top with its upper end portion positioned above the T-Top and its lower end portion positioned below it. A tubular outrigger having a bottom end portion and an elongated fishing line support portion extending upwardly from the bottom end portion is rotatably journalled in the tubular member. A locking unit is associated with the lower end portion of the tubular member to prevent the bottom end portion of the outrigger from rotating in the tubular member.

13 Claims, 7 Drawing Sheets

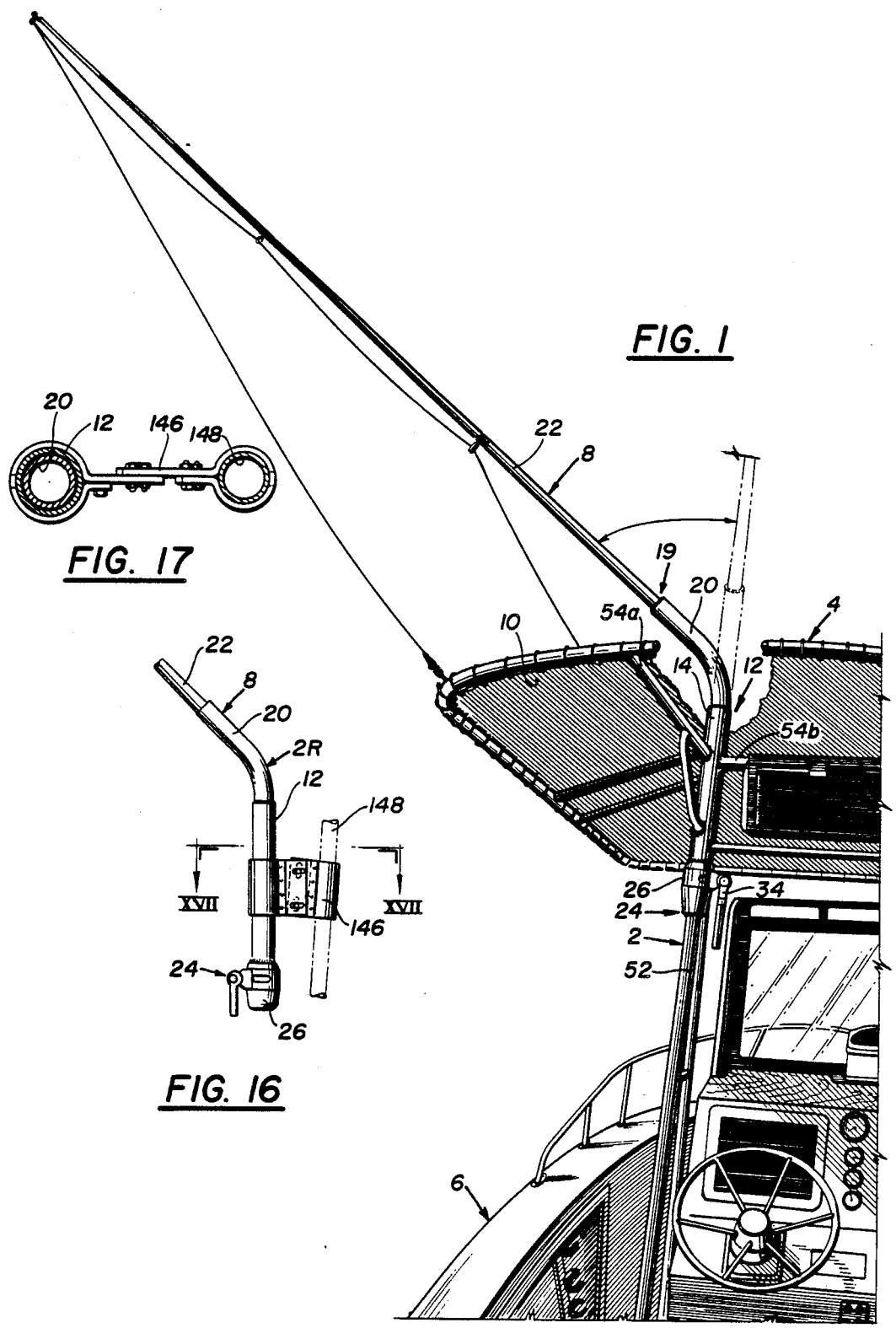

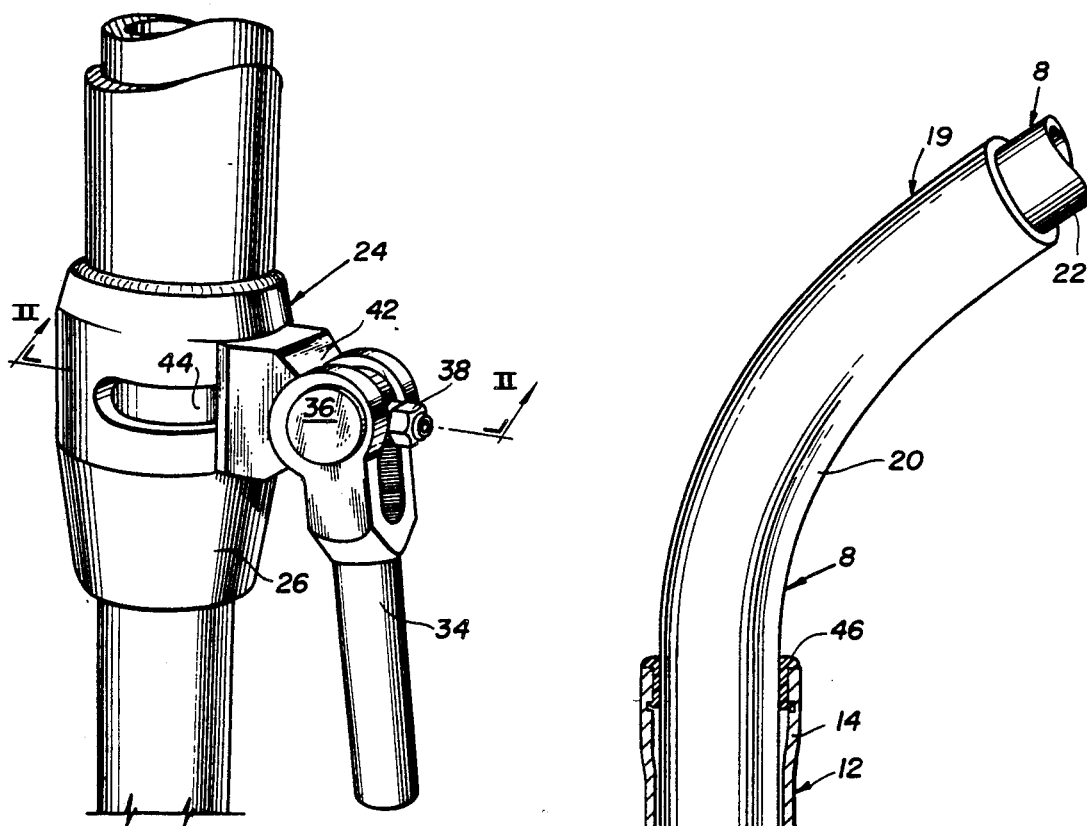
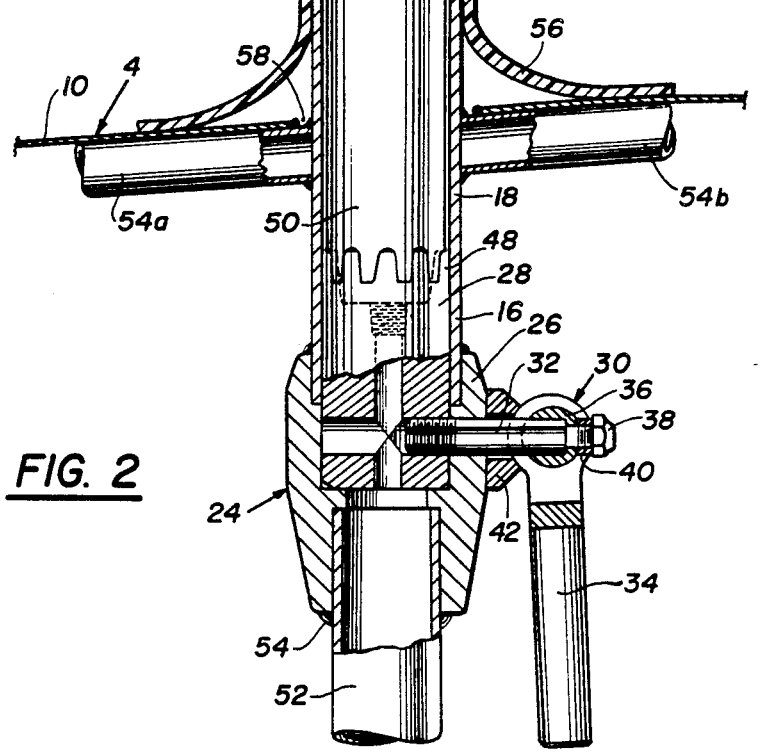
FIG. 3
FIG. 2

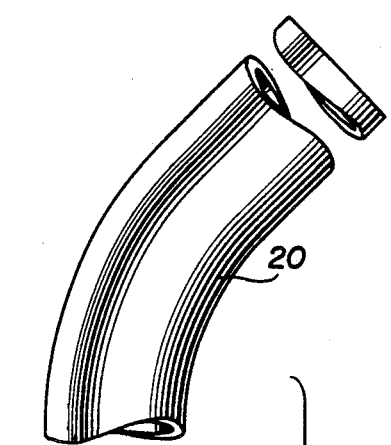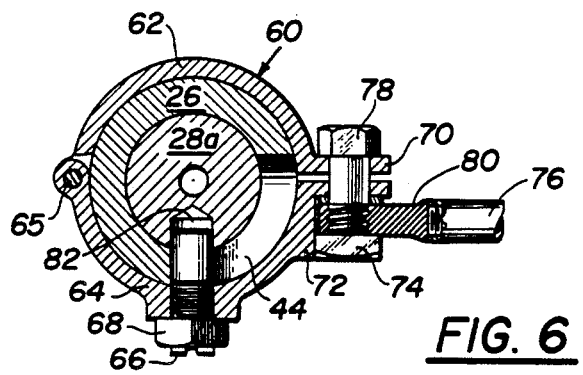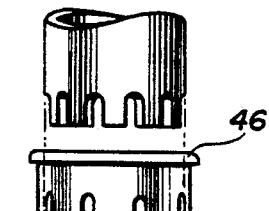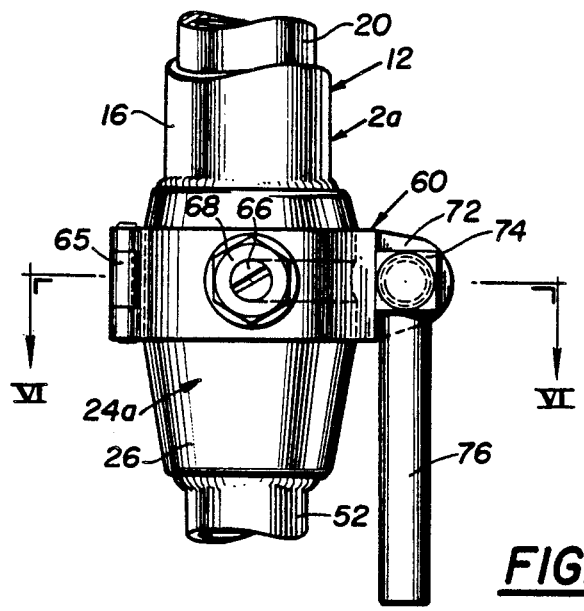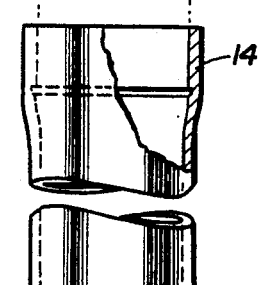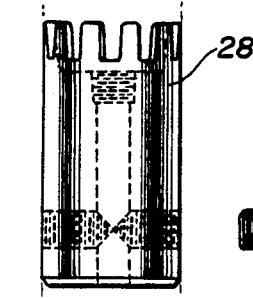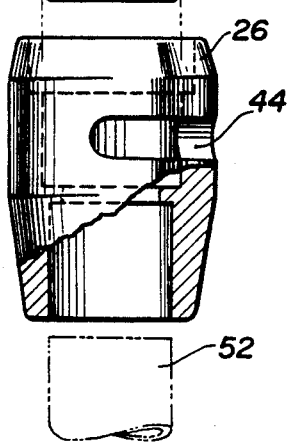
FIG. 6
FIG. 5
FIG. 4

OUTRIGGER SYSTEMS FOR MOTORBOATS

RELATED APPLICATION

This application is a continuation-in-part of copending application Ser. No. 07/395,817, filed Aug. 18, 1989, now abandoned.

BACKGROUND OF THE INVENTION

1. Field of the Invention

This application relates broadly to fishing equipment. More particularly, it concerns outrigger systems for use in association with motor boats, especially the center console type fitted with so-called T-Tops.

2. Description of the Prior Art

In sportsfishing operations, a conventional procedure is to troll fishing lines astern of the fishing boat from outrigger devices that hold the lines spaced apart a sufficient distance to prevent them from becoming entangled with one another due to the movement of the boat or the action of the sea Typically, each outrigger device includes an elongated tubular unit, e.g., 10–30 ft. long, having its inboard end fastened in some manner to the fishing boat so that it can be moved from a stowage position while the boat is not actually engaged in fishing, i.e., underway to or from the fishing grounds, to a trolling position while the boat is engaged in fishing.

On large, offshore type sportsfishing boats, the outrigger devices are typically of the tubular, cabletrussed, mast type pivoted by their inboard ends upon a vertical portion of the cabin or other boat superstructure and have associated boom elements to enable the outrigger to be firmly held in the stowage or trolling position while permitting easy movement between such separated positions (see U.S. Pat. No. 4,632,050).

On smaller fishing boats, often powered by outboard motors, the outrigger devices are less complicated than the tubular mast type used on the offshore, sportsfishing boats. Typically, such outriggers comprise only a single piece of tubing, often tapered, pivoted by the inboard end to the gunwale or equivalent horizontal surface of the boat (see U.S. Pat. No. 3,008,259).

One style of the smaller fishing boats that is very popular with sportfishermen, because the layout of such boats provides a large area of cockpit sole for use by boat occupants during fishing, is the so-called "center console" type. This style of fishing boat is frequently equipped, either as original equipment or as a retrofit, with a superstructure for protection against sun and weather, called T-Tops, because they consist of canopy top held aloft typically with upright tubular supports fixed to the center console.

When used for fishing, T-Top style boats are frequently equipped with outriggers. Prior to this present invention, such outriggers have been structured in a manner that has required the boat occupants to reach over the top of the T-Top in order to manipulate the outriggers to move them from a stowage to a trolling position, or vis versa. This typically requires such person to stand on the gunwale or like superstructure of the boat in a relatively unsafe position, particularly if the boat is operating in rough sea conditions. In spite of the obvious shortcoming of the existing forms of outrigger devices for T-Top style boats, boat operators have continued to abide with them due to lack of better systems.

In addition to T-Top motorboats, other motorboats having various types of tops, canopies or the like have been equipped with outriggers in an manner that has required boat occupants to reach over the top or like covering in order to manipulate the outriggers. The present invention addresses this problem and provides the art with new forms of outrigger devices for use with T-Top or other covered motorboats that eliminate such problem. For the sake of brevity in disclosing and claiming the invention, the text will refer specifically to T-Tops and T-Top motorboats, but it is to be understood that the invention is capable of use with other types of motorboats and that use of the invention on such other motorboats is intended to be covered.

OBJECTS

A principal object of the invention is the provision of new forms of outrigger systems for use with motorboats.

A further object is the provision of outrigger devices for use with T-Top and other motorboats that enable occupants of the boat to manipulate the outriggers to move them from a stowage to a trolling position, or vis versa, without need to reach over the top of the T-Top or like obstruction, i.e., permit manipulation from a safe position in the boat beneath the obstruction.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of an improved outrigger device installed on a T-Top equipped motorboat, but, in contrast to prior known outrigger devices for such motorboats, that permits the outrigger thereof located above the T-Top to be moved from a stowage position to a trolling position and vis versa by an operator standing in the boat in the shelter of such T-Top.

One essential unit of the improved outrigger device is a tubular member comprising an upper end portion and a lower end portion joined integrally to a central portion that extends through the T-Top with the upper end portion positioned above the T-Top and the lower end portion positioned below the T-Top.

The new device also includes a tubular outrigger that moves in an arc above the T-Top. Such outrigger comprises a bottom end portion that includes an arcuate section and an elongated fishing line support portion extending upwardly from such bottom end portion.

The bottom end portion of the outrigger is rotatably journalled in the tubular member that extends though the TTop and locking means is associated with the lower end portion of such tubular member to prevent the bottom end portion of the outrigger from rotating in the tubular member.

In preferred embodiments, the locking means of the outrigger device comprises a collar member, a tubular element rotatably journalled in the collar member, and cam means to lock the cylindrical element against rotation in the collar member. Such cam means may include a bolt extending normally from the cylindrical element, an eccentric lever carried by the bolt outboard of the collar and a friction block is captured on the bolt between the lever and the collar. The collar has an arcuate slot therein through which the bolt extends to permit angular movement of the bolt relative to the collar.

So that the outrigger will be able to rotate freely in the tubular member when the locking means is unlocked, the upper end portion of the tubular member is fitted with a plastic ring element that serves as the bearing that journals the bottom end portion of the outrigger.

In order to enable the outrigger to be removed from the remainder of the new device, the cylindrical element of the locking means may have a castellated end extending into the lower end portion of the tubular member and the bottom end portion of the outrigger is castellated to mate with the castellated end of the cylindrical element. Other arrangements may be used to enable the outrigger to be removed from the portion of the device fixed to the T-Top.

So that the load of the new outrigger device will not need to be carried solely by the T-Top, the locking means may have depending therefrom a tubular standard that extends to the cockpit sole of the motorboat.

Advantageously, the collar is welded at its top end to the lower end portion of the tubular member that extends through the T-Top and the bottom end of the collar is welded to the tubular standard.

The new outrigger devices can be installed as original equipment on T-Top style motorboats. Alternatively, a packaged kit comprising the tubular member, the tubular outrigger, the locking means and related hardware items can be marketed to retrofit a T-Top equipped, center console motorboat or other motorboats with a new outrigger device of the invention.

BRIEF DESCRIPTION OF THE DRAWINGS

A more complete understanding of the invention can be obtained by reference to the accompanying drawings in which:

FIG. 1 is a fragmentary perspective view of a T-Top equipped, center-console motorboat equipped with an outrigger system of the invention.

FIG. 2 is a fragmentary, lateral view of a portion of the outrigger system shown in FIG. 1, sectioned on line II—II of FIG. 3.

FIG. 3 is a fragmentary, isometric view of the locking means of the outrigger system shown in FIG. 1.

FIG. 4 is an exploded view corresponding to FIG. 2.

FIG. 5 is a fragmentary, lateral view of a second embodiment of locking means for the new outrigger systems.

FIG. 6 is a sectional view taken on line VI—VI of FIG. 5.

FIG. 16 is a fragmentary lateral view of a retrofit embodiment of an outrigger device of the invention.

FIG. 17 is a sectional view taken on the line XVII—XVII of FIG. 16.

DESCRIPTION OF THE PREFERRED EMBODIMENTS

Figure 8:
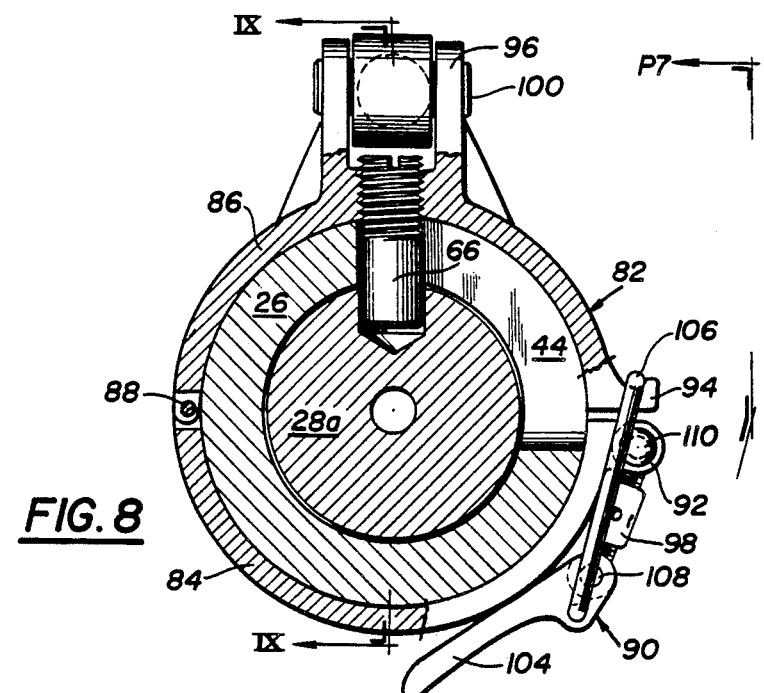
FIG. 8 is a fragmented sectional view taken on the line VIII—VIII of FIG. 7.

Referring in detail to the drawings in which identical parts are identically numbered, the improved outrigger device 2 of the invention shown installed on the T-Top 4 of the motorboat 6 permits the outrigger 8 thereof located above the top surface 10 of T-Top 4 to be moved from a stowage position (shown in phantom line) to a trolling position (shown in solid line) and vis versa.

One essential unit of the improved outrigger device is a tubular member 12 comprising an upper end portion 14 and a lower end portion 16 joined integrally to a central portion 18 that extends through the T-Top 4 with the upper end portion 14 positioned above the T-Top 4 and the lower end portion 16 positioned below the T-Top.

The tubular outrigger 8 that moves in an arc above the T-Top 4 comprises a bottom end portion 19 that includes an arcuate section 20 and an elongated fishing line support portion 22 extends upwardly from such bottom end portion 19.

The arcuate section 20 of the outrigger 8 is rotatably journalled in the tubular member 12 and locking means 24 is associated with the lower end portion 16 of tubular member 12 to prevent the outrigger 8 from rotating in the tubular member 12.

In the embodiment shown in FIGS. 1–4, the locking means 24 comprises a collar member 26, a cylindrical element 28 rotatably journalled in the collar member 26 and cam means 30 to lock the cylindrical element against rotation in the collar member 26.

Cam means 30 has a bolt 32 threaded into and extending normally from the cylindrical element 28. An eccentric lever 34 and associated support pin 36 are carried on the bolt 32 by the nut 38 and washer 40 outboard of the collar 26. A friction block 42 is captured on the bolt 32 between the lever 34 and the collar 26.

The collar 26 has an arcuate slot 44 therein through which the bolt 32 extends to permit angular movement of the bolt 32 relative to the collar 26.

So that the outrigger 8 will be able to rotate freely in the tubular member 14 when the locking means 24 is unlocked, the upper end portion 14 of the tubular member 12 is fitted with a plastic ring element 46 that serves as the bearing that journals the arcuate section 20 of the outrigger 18.

To move the outrigger 8 from one position to another, a person (not shown) standing the the motorboat 6 beneath the T-Top 4 grasps the lever 34 and lifts it to a horizontal position. Through cam action, this reduces the pressure of block 42 on the outer surface of collar 26 thereby permitting the lever 34 to be moved relative to collar 26 so the element 28 and, in turn, arcuate member 20 may be rotated. When the outrigger is brought into a new position relative to longitudinal axis of the motorboat 6, the lever 34 is pulled down to assume a position as shown in FIG. 1 and thereby again lock the outrigger in the new position. Hence, the movement of the outrigger 8 from a stowage position to a trolling position and vis versa can be accomplished by a person standing under the T-Top 4 and safely within the motorboat 6.

The pressure applied by the caming action of the lever 34 on the block 42 when moved from the horizontal position (not shown) to the vertical position (see FIG. 1) can be adjusted by tightening or loosening nut 38.

In order to enable the outrigger 8 to be removed from the tubular member 12, the cylindrical element 28 of the locking means 24 has a castellated end 48 extending into the lower end portion 16 of the tubular member 12 and the bottom end portion 50 of the outrigger 8 is castellated to mate with the castellated end 48 of the cylindrical element 28. Other arrangements may be used to enable the outrigger 8 to be removed from the portion of the device fixed to the T-Top as illustrated in further embodiments described below.

So that the load of the new outrigger device 2 will not need to be carried solely by the T-Top 4, the locking means 24 has depending therefrom a tubular standard 52 that extends to the cockpit sole (not shown) of the motorboat 6. As shown in FIGS. 1 & 2, the standard 52 is fixed by welding 54 to the locking means collar 26 and to the lower end portion 16 of the tubular member 12.

Other arrangements for supporting the weight of the outrigger devices 2 may be substituted for the standard 52. For example, FIG. 1 shows standard 52 plus tubular member 12 as being integrated with struts 54a, 54b, etc. that form part of the frame of the T-Top 4, but the tubular member 12 and other the parts of the device 2 can be made independent of any of the parts of the frame of the T-Top 4.

A plastic canopy 56 is provided to weatherproof the opening 58 in the T-Top 4 through which the tubular member 12 extends.

A second embodiment of locking means 24a for the device 2a of the invention is shown in FIGS. 5 & 6.

In addition to a collar 26 with its slot 44, the locking means 24a comprises a cylindrical element 28a and a compression ring unit 60.

Ring unit 60 comprises semi-circular ring members 62 & 64 hinged together by pin 65, screw 66 and lock nut 68. Member 62 has straight flange 70 on its unhinged end and similarly member 64 has an L-shaped flange 72. The bolt 74 extends through bores in the flanges 70 & 72 plus a bore in the handle 76 so that tightening the bolt on the nut 78 compresses together the ring members 62 & 64 and applies pressure on the inner end 80 of the handle 76.

The screw 66 threads into the bore 82 in the cylindrical element 28a so that rotation of ring unit 60 produces like rotation in element 28a. Since element 28a is connected to arcuate member 20 as previously described, its rotation causes a like rotation of member 20 and, in turn, rotation of the fishing line support portion 22 of outrigger 8.

The pressure applied by the tightening action of the lever 76 on the ring members 62 & 64 when moved from the horizontal position (see FIG. 6) to the vertical position (see FIG. 5) can be adjusted by tightening or loosening nut 78.

Figure 7:
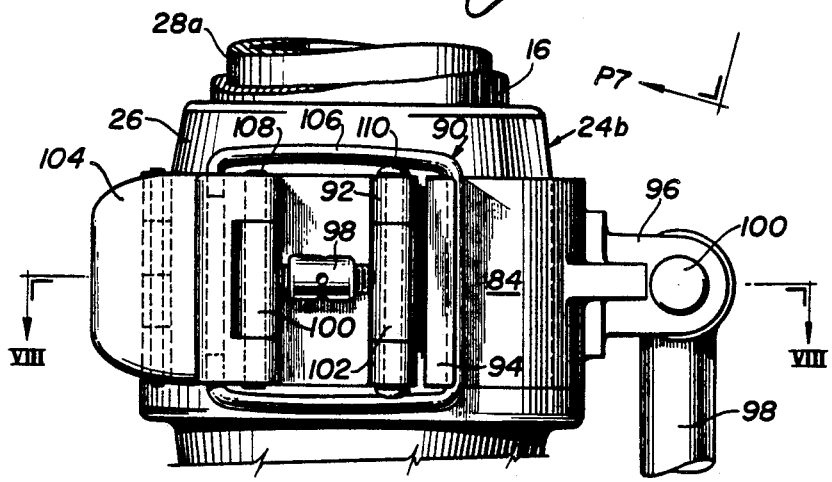
FIG. 7 is a fragmentary view a third embodiment of locking means for the new outrigger systems in an unlatched mode as viewed from the perspective of P7—P7 of FIG. 8.
Figure 9:
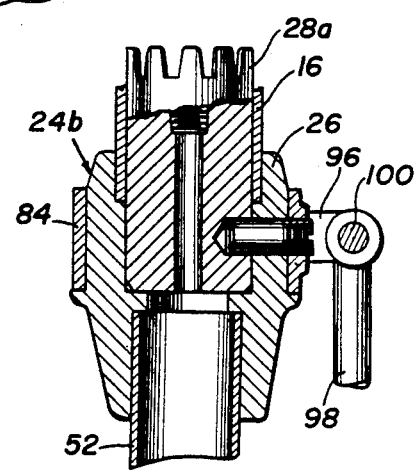
FIG. 9 is a sectional view taken on the line IX—IX of FIG. 8.
Figures 10, 11, 12, 13:
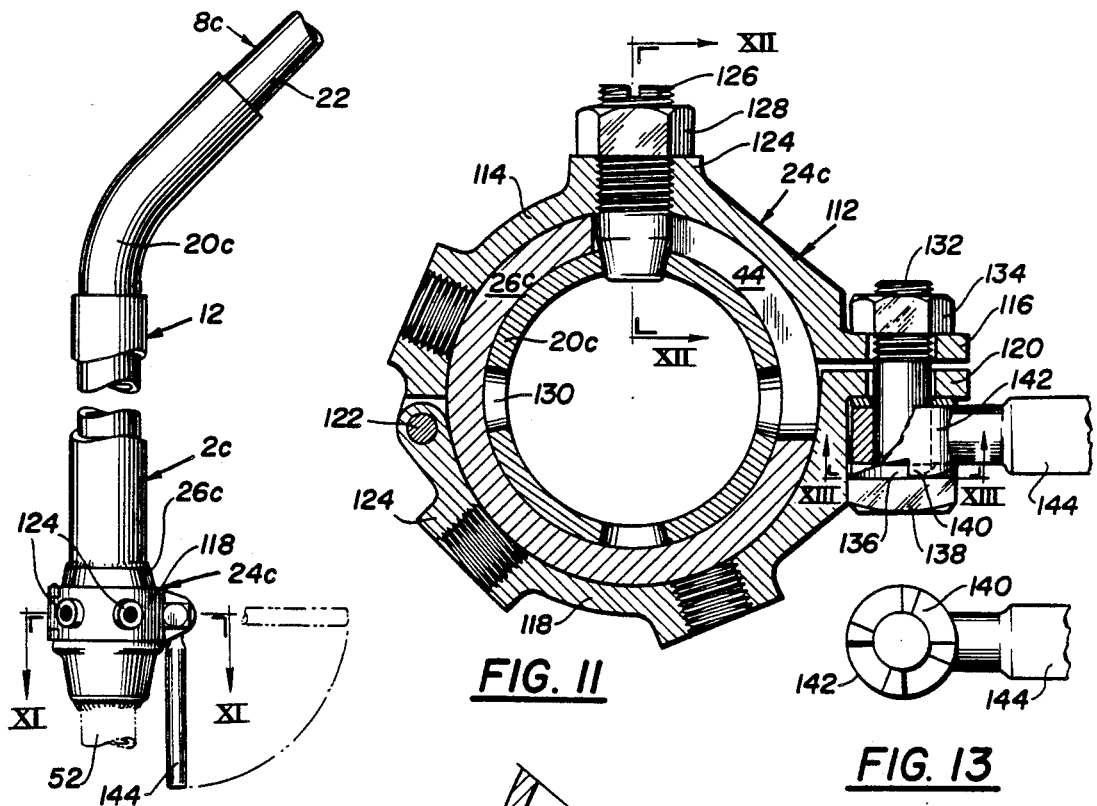
FIG. 10 is a fragmentary lateral view of a fourth embodiment of the new outrigger systems.
FIG. 11 is a fragmented sectional view taken on the line XI—XI of FIG. 10.
FIG. 12 is a fragmentary sectional view taken on the line XII—XII of FIG. 11.
FIG. 13 is a fragmentary sectional view taken on the line XIII—XIII of FIG. 11.

A third embodiment of locking means 24b for the device 2b of the invention is shown in FIGS. 7-9.

In addition to a collar 26 with its slot 44, the locking means 24b comprises a cylindrical element 28a and a compression ring unit 82.

Ring unit 82 comprises semi-circular ring members 84 & 86 hinged together by pin 88, screw 66 and lever clamp means 90. Member 84 has flange 92 on its unhinged end while member 86 carries lip flange 94 and U-shaped lug 96. The lever 98 is pivoted on the lug 96 by the pin 100.

Clamp means 90 comprises turnbuckle 98 fixed at its ends to hinge elements 100 & 102, throw 104 and buckle 106. Hinge element 100 is fitted to throw 104 by pin 108 and hinge element 102 is similarly fitted to flange 92 by pin 110.

With locking means 24b installed with a device of the invention, outrigger 8 is moved from a stowage position to trolling position or vis versa by pulling outward on throw 104 to release the clamp means 90. This frees cylindrical element 28a to rotate in collar 26. With the handle 98 raised horizontally, sufficient turning force can be applied to move screw 66 across the slot 44 to relocate the outrigger from one position to the other. When such move is completed, throw 104 is pushed to return it to the position shown in FIG. 8 and relock cylindrical element 28a against turning in the collar 26.

A fourth embodiment of locking means 24c for the device 2c of the invention is shown in FIGS. 10-13. Unlike devices 2, 2a & 2b, device 2c does not include a part similar to cylindrical elements 28 & 28a and the arcuate section 20c is extended at its lower end 50c to function as a replacement for such cylindrical elements.

In addition to a collar 26c with its slot 44, the locking means 24c includes a compression ring unit 112 comprising ring member 114 with flanged end 116 and ring member 118 with flanged end 120. The members 114 & 118 are hinged together by pin 122.

The ring members 114 & 118 each have a pair of lateral ports 124 into which screw 126 may be threaded to be locked in position by nut 128. The inboard end of screw 126 fits into one of the holes 130 in the lower end 50c of arcuate member 20c. The positioning of the outrigger 8c relative to the fixed position of collar 26c can be varied by location of the screw 126 in one of the four lateral ports 124 in the locking means 24c.

Special bolt 132 extends through bores in the flanges 116 & 120 and is caused by the nut 134 to have the lands 136 on its head 138 tighten against the lands 140 on the ringed end 142 of the lever 144.

The lever 144 is used to move the outrigger from one of its operative positions to the other. Thus, by movement of the lever 144 from the vertical position (solid in FIG. 10) to the horizontal (phantom in FIG. 10), the clamping force applied by ring members 114 & 118 to the collar 26c is released allowing the screw to move across the slot 44 and turn the lower end 50c of arcuate member 20c. Returning the lever 144 to the vertical position relocks the locking means 24c to fix the outrigger 8c in the new position. The precise amount of clamping force applied in this manner may be adjusted to tightening or loosening nut 134 on bolt 132.

Figure 14:
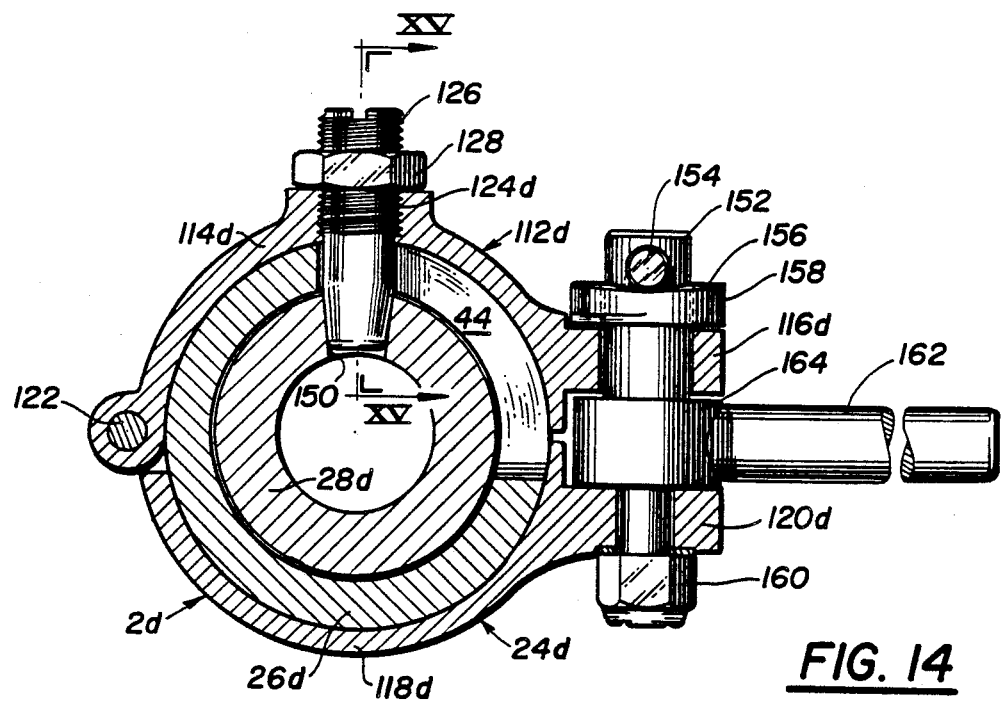
FIG. 14 is transverse, sectional view of a fifth embodiment of the new outrigger systems.
Figure 15:
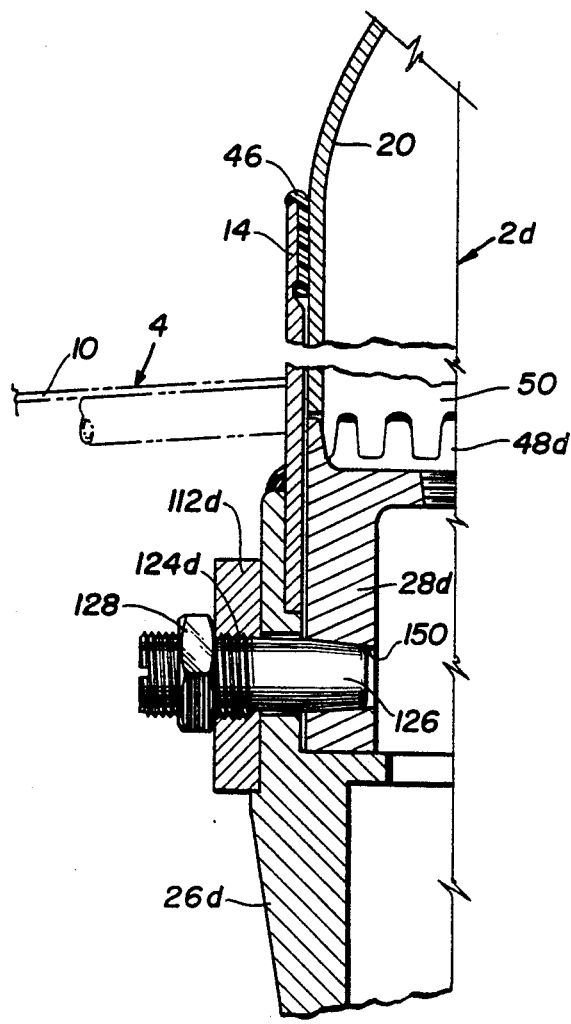
FIG. 15 is fragmented sectional view taken on the line XV—XV of FIG. 14.

A fifth embodiment of locking means 24d for the device 2d of the invention is shown in FIGS. 14 & 15.

In addition to a collar 26d with its slot 44, the locking means 24d includes a compression ring unit 112d comprising ring member 114d with flanged end 116d and ring member 118d with flanged end 120d. The members 114d & 118d are hinged together by pin 122.

The ring member 114d has a lateral ports 124d into which screw 126 may be threaded to be locked in position by nut 128. The inboard end of screw 126 fits into hole 150 in element 28d to fix the position of collar 26d relative to the locking means 24d.

Special bolt 152 with pin 154 in one end extends through bores in the flanges 116d & 120d and has pin 154 compressed against the landed surface 156 of ring member 158 by the self-locking nut 160.

The lever 162, which is threaded into boss 164 of bolt 152, is used to move the outriqger device 2d from one of its operative positions to the other. Thus, by movement of the lever 162 from the vertical position (not shown) to the horizontal shown in FIG. 14, the clamping force applied by ring member 158 to the collar 26d is released allowing the screw to move across the slot 44 and turn the element 28d and, in turn, arcuate member 20. Returning the lever 162 to the vertical position relocks the locking means 24d to fix the outrigger in the new position. The precise amount of clamping force applied in this manner may be adjusted to tightening or loosening nut 160 on bolt 152.

A sixth embodiment of locking means 24e for the device 2e of the invention is shown in FIGS. 18–23.

In addition to a collar 26e with its slot 44, the locking means 24e includes plunger means 166, castellated tubular element 168 and lever 170.

Plunger means 166 comprises a saddle 172 fixed to collar 26e by welding 174, lever member 176 carried on the bolt 178 and plunger 180 having a forward end 182 and rear end 184. A plate 186 fastened to saddle 172 by screws 188 carries a bushing 188 in which the end 184 of plunger 180 slides. The coil spring 190 compressed between the bushing 188 and plunger collar 192 biases the plunger 180 toward and through the bore 194 in collar 26e.

The castellated tubular element 168, which is advantageously injection molded from tough plastic, comprises a threaded lug 196, a plurality of spaced apart radial bores 198 and reinforcement web 200. The inner end of lever 170 threads into the lug 196.

Figure 18:
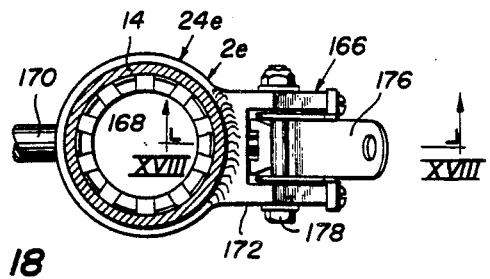
FIG. 18 is transverse, sectional view of a sixth embodiment of the new outrigger systems.
Figure 21:
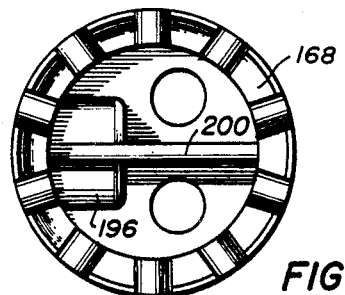
FIG. 21 is a plan view of the castellated tubular element of the sixth embodiment.
Figure 19:
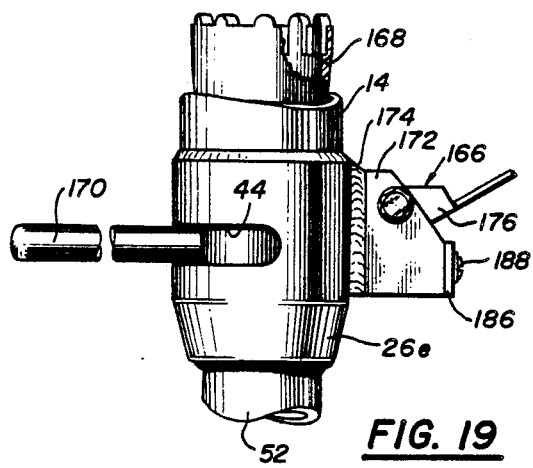
FIG. 19 is a fragmentary, lateral view of the sixth embodiment.
Figure 22:
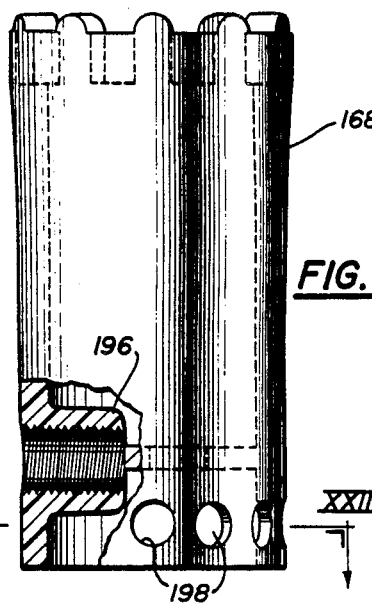
FIG. 22 is a fragmented lateral view of the castellated tubular element.
Figure 20:
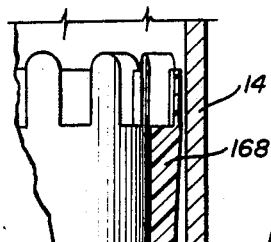
FIG. 20 is fragmented sectional view taken on the line XVIII—XVIII of FIG. 14.
Figure 23:
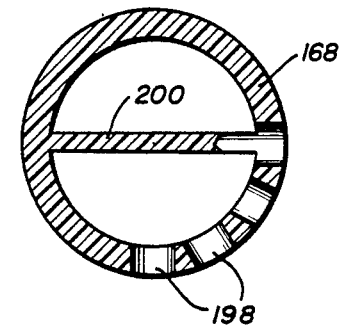
FIG. 23 is a sectional view taken on the line XXIII—XXIII of FIG. 22.

With the parts of the locking means 24e assembled as shown in FIGS. 18–20, the end 182 of plunger 180 is caused by spring 190 to protrude into one of the bores 198 of the tubular element 168 locking it against rotation relative to collar 26e. When the fisherman using the device 2e wishes to rotate the outrigger associated therewith, he will grab the lever 170 in one hand and push upwardly with his other hand on the extension 202 of the lever member 176. This retacts plunger end 182 from the bore 198 enabling the tubular element 168 to turn within the collar 26e to move the outrigger into another position as determined by another one of the plural bores 198. Release of the extension 202 then permits to plunger end 182 to enter another of the bores 198 to t hereby lock the outrigger in a new position.

FIG. 1 shows a device of the invention installed as original equipment with a T-Top 4 of a motorboat 6. In contrast; FIGS. 16 & 17 illustrate a retrofit version of a device 2R of the invention for addition to the T-Top of a motorboat not originally equipped with a device of the invention.

In the embodiment of the retrofit device 2R as shown, a clamp 146 is provided to fix tubular member 12 of device 2R to an upright 148 that forms one of the vertical supports for the T-Top (not shown). Obviously, a variety of other arrangements will be apparent to those skilled in the art for retrofitting any device of the invention to an existing T-Top equipped motorboat that does not have such device installed as original equipment.

The embodiments of the invention in which an exclusive property or privilege is claimed are defined as follows:

1. In an outrigger device installed on a top equipped motorboat to permit the outrigger of said device located above said top to move from a stowage position to a trolling position and vis versa, the improvement that permits said movement to be performed by an operator standing in the boat in the shelter of said top which comprises:
   a tubular member comprising an upper end portion and a lower end portion joined integrally to a central portion that extends through said top with said upper end portion positioned above said top and said lower end portion positioned below said top,
   a tubular outrigger comprising a bottom portion having a lower end including an arcuate section, and an elongated fishing line support portion extending upwardly from said bottom portion,
   said bottom portion of said outrigger being rotatably journalled in said tubular member, and
   locking means associated with said lower end portion of said tubular member to prevent said bottom portion of said tubular outrigger from rotating in said tubular member.

2. The outrigger device of claim 1 wherein said locking means has depending therefrom a standard that extends to the cockpit sole of said motorboat.

3. The outrigger device of claim 1 wherein said locking means comprises:
   a collar member,
   a cylindrical element rotatably journalled in said collar member,
   and cam means to lock said cylindrical element against rotation in said collar member.

4. The outrigger device of claim 3 wherein said cam means includes a bolt extending normally from said cylindrical element, an eccentric lever carried by said bolt outboard of said collar and a friction block captured on said bolt between said lever and said collar.

5. The outrigger device of claim 4 wherein said cylindrical element has a castellated end extending into said lower end portion of said tubular member and said bottom portion is castellated to mate with said castellated end.

6. The outrigger device of claim 5 wherein said upper end portion of said tubular member is fitted with a plastic ring element that serves as the bearing that journals said bottom portion of said outrigger.

7. The outrigger device of claim 4 wherein said collar has an arcuate slot therein through which said bolt extends and permits angular movement of said bolt relative to said collar.

8. The outrigger device of claim 3 wherein said collar is welded at one end to said lower end portion.

9. The outrigger device of claim 8 wherein the end of said collar opposite to said one end is welded to said standard.

10. As an article of manufacture, a packaged kit comprising parts for an outrigger device to be installed on a top equipped motorboat to permit the outrigger of said device located above said top to be moved from a stowage position to a trolling position and vis versa by an operator standing in the boat in the shelter of said top, said parts comprising:
- a tubular member defined by an upper end portion and a lower end portion joined integrally to a central portion structured to extend through said Top with said upper end portion positioned above said top and said lower end portion positioned below said top,
- a tubular outrigger comprising a bottom portion having a lower end including an arcuate section, and an elongated fishing line support portion extending upwardly from said bottom portion,
- said bottom portion of said outrigger being rotatably journalled in said tubular member, and
- locking means associated with said lower end portion of said tubular member to prevent said bottom portion of said tubular outrigger from rotating in said tubular member.

11. In an outrigger device installed on a top equipped motorboat to permit the outrigger of said device located above the top of said top to move from a stowage position to a trolling position and vis versa, the improvement that permits said movement to be performed by an operator standing in the boat in the shelter of said top which comprises:
- a tubular member comprising an upper end portion and a lower end portion joined integrally to a central portion that extends through said top with said upper end portion positioned above said top and said lower end portion positioned below said top,
- a tubular outrigger comprising a bottom portion having a lower end including an arcuate section, and an elongated fishing line support portion extending upwardly from said bottom portion,
- said bottom portion of said outrigger being rotatably journalled in said tubular member,
- locking means associated with said lower end portion of said tubular member to prevent said bottom portion of said tubular outrigger from rotating in said tubular member, said locking means including a collar member,
- a cylindrical element rotatably journalled in said collar member, and
- means to lock said cylindrical element against rotation in said collar member, and
- a standard that extends to the cockpit sole of said motorboat depending from said locking means to help support the weight of said device.

12. The outrigger device of claim 11 wherein said means to lock comprises a cam lever.

13. The outrigger device of claim 11 wherein said means to lock comprises a spring biased plunger.

* * * * *